May 24, 1938.   K. W. CONNOR   2,118,167
SEPARATOR
Filed Dec. 12, 1935   2 Sheets-Sheet 2
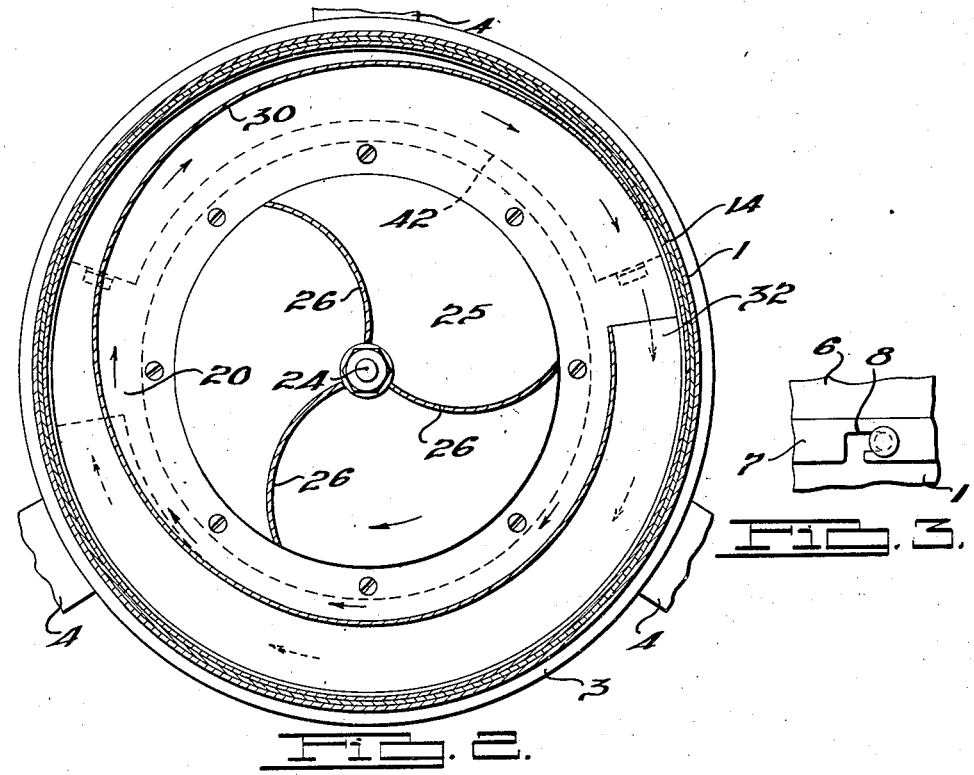
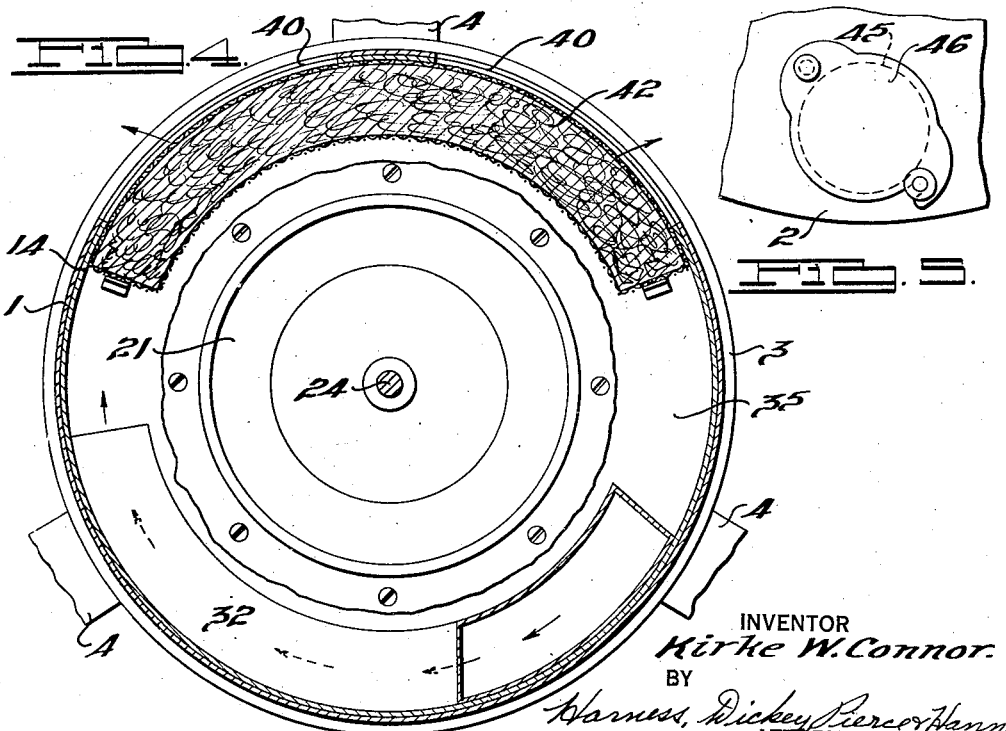
INVENTOR
Kirke W. Connor.
BY
Harness, Dickey, Pierce & Hann.
ATTORNEYS.

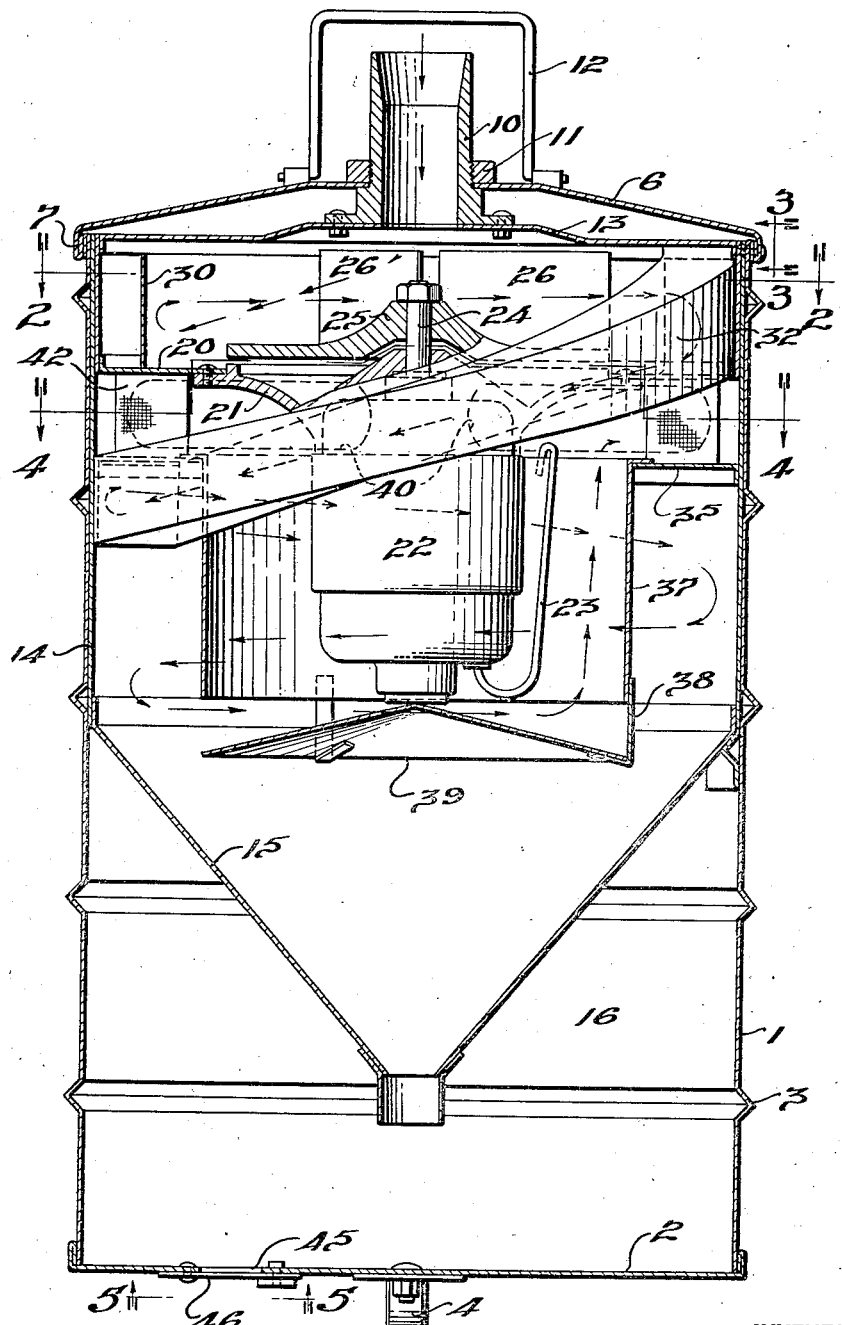

Patented May 24, 1938

2,118,167

UNITED STATES PATENT OFFICE 2,118,167

SEPARATOR

Kirke W. Connor, Detroit, Mich., assignor to Micromatic Hone Corporation, a corporation of Michigan Application December 12, 1935, Serial No. 54,097

6 Claims. (Cl. 183—92)

This invention relates generally to separators. More particularly it relates to a type of separator which is primarily adapted for the purpose of separating dust and minute metallic particles and fragments from air.

While the generic inventive concept disclosed in the present application is susceptible of many and various uses, the specific embodiment of the invention illustrated and described herein is primarily adapted for use in connection with grinding and abrasive machinery for the purpose of collecting the dust therefrom and purifying the air therearound.

It is a general object of the present invention to provide apparatus of this general class which will be relatively simple in construction and which will effectively serve to prevent the dissemination of minute metallic particles resulting from various grinding and abrasive operations and which will serve to purify the air in places where such operations take place.

It is a still further object of the present invention to provide a construction of this general type which is convenient and compact in form and which may easily and conveniently be transported from place to place, in order that it may be used with any one of a number of different pieces of apparatus for processing the air therefrom. The present invention contemplates the provision of a substantially cylindrical casing having a centrifugal blower mounted therein and means within the casing for effectively separating minute particles of foreign matter from air drawn into the casing and subsequently filtering the air and discharging it from the casing.

Still further, the present invention contemplates the provision of a relatively novel and simple construction which may be conveniently disassembled for purposes of adjustment and repair and which in its assembled form will be extremely compact and convenient in operation.

Yet another object of the present invention consists in the provision of a novel filter arrangement for use in connection with apparatus of this general class which may be relatively easily removed and renewed as may be desired.

Yet another feature of the present invention consists in a novel baffle construction interiorly of the casing which, though simple in construction, provides extremely effective means for separating minute dust particles from the air circulated through the casing.

Many other and further objects and advantages of the present invention will become apparent from the following specification when considered in connection with the accompanying drawings forming a part thereof.

In the drawings:

Figure 1 is a vertical sectional view through the casing of the improved dust separator showing the internal arrangements of parts;

Fig. 2 is a transverse sectional view taken on the line 2—2 of Fig. 1 showing the blower chamber and the manner in which the intake air is driven therethrough;

Fig. 3 is a fragmentary elevational view taken on the line 3—3 of Fig. 1 illustrating the manner in which the casing cover is connected to the body portion thereof;

Fig. 4 is a transverse sectional view taken on the line 4—4 of Fig. 1 showing in detail the mounting of the improved filter adjacent the outlet of the casing;

Fig. 5 is a fragmentary bottom view of the casing showing in detail the clean-out opening therein.

With more particular reference to the drawings, the specific embodiment of the invention disclosed therein comprises in general a casing 1 which is preferably of cylindrical form and permanently closed at the bottom by means of a bottom wall 2 secured to the cylindrical wall structure of the casing. In order to provide strengthening ribs for the casing, the walls thereof may be preformed at suitable vertical intervals to provide annular beads 3 therearound which will greatly add to the strength of the casing as a whole and provide an attractive exterior appearance. While the casing as a whole may be mounted on rollers or other convenient means, it is preferable to support the base thereof substantially above the floor and to accomplish this are shown three sheet metal members 4 secured to the bottom of the casing and providing short legs which serve to provide a permanent substantial support for the casing. The casing is closed at its upper end by means of a suitable arched cover 6 which has an axially extending flange 7. This flange is provided at suitable intervals therearound with L-shaped slots 8 therein seen in Fig. 3. These L-shaped slots 8 serve to cooperate with suitable pins projecting from the outer upper edge of the casing and serve to provide means for locking the cover 6 onto the casing 1 and effecting a tight closure thereof with respect to the casing.

Substantially in the axially central portions of the cover 6 is mounted an inlet duct 10. This inlet duct 10 is provided on its outer surface with a suitable shoulder and is threaded to receive a collar 11 which serves to lock this duct firmly in position with respect to the cover 10 in which it is mounted. The upper surface of the casing is also preferably provided with a suitable pivotally mounted bail or handle 12 which may conveniently serve for transporting the entire separator structure from place to place.

The lower end of the intake duct 10 is flanged and secured to a blower chamber cover 13 which is flanged in its peripheral edge and permanently secured to an inner casing member 14 adapted to fit closely, telescopically within the casing 1. The inner casing 14 extends substantially half way down within the casing 1 and has secured to the lower marginal edge thereof a hopper 15 which, as will hereinafter be seen, serves to conduct the solid material separated from the air down into a refuse compartment 16 formed in the lower portion of the casing.

Spaced beneath the blower chamber cover 13 and mounted within the inner casing member 14 and permanently secured thereto is a partitioning member 20 which extends transversely of the casing and is provided in its central portion with a relatively large circular opening. An annular casting 21 is secured at the marginal edge of this opening and serves to mount an electric motor 22 substantially in the axial central portion of the casing. The motor 22 may be driven by any suitable source of electric current conducted thereto by means of the cable 23. The motor 22 has a shaft 24 projecting into the blower chamber on which is mounted a suitable centrifugal blower fan 25 having a plurality of curved substantially radially disposed blades 26. It will be appreciated that the motor 22 is mounted substantially axially of the casing 1 and consequently the axis of rotation thereof is substantially co-axial with respect to the inlet opening 10. Consequently the centrifugal action of the fan blades 26 will serve to drive air coming in the inlet opening 10 outwardly towards the outer walls of the blower chamber and will impart a swirling action thereto.

A spirally disposed partition wall 30 is arranged in the blower chamber around the blower and serves as a baffle to guide air therefrom into a helically disposed conduit 32 which conducts the swirling air in a helically downward path adjacent the outer wall of the casing.

Arranged underneath the partition wall 20 and spaced therefrom is a second transverse partition wall 35 which is flanged in its peripheral edge and secured to the cylindrical inner casing member 14. This partitioning wall 35 is provided with a sufficiently large circumferentially extending opening to permit the helically disposed duct 32 to pass therethrough in order that the air from the blower chamber will be delivered into the casing at a point beneath this partition wall 35. The partition wall 35 is provided in its axial central portion with a relatively large circular opening and has mounted in this opening a downwardly extending cylindrical baffle 37 which surrounds, and is substantially spaced from, the electric motor 22. The baffle 37 has secured to its lower marginal edge by means of a plurality of brackets 38 a conical baffle plate 39, the purpose and function of which will hereinafter be clear.

Both the casing 1 and the inner cylindrical casing member 14 are provided with registering circumferentially extending outlet ports 40 in the side thereof, each extending through an arcuate distance of about 60 degrees and of a vertical extent not greater than the distance between the partitioning members 20 and 35.

A filter cartridge 42 of generally arcuate shape and of a length sufficiently long to completely cover the outlet openings 40 is mounted within the space between the partition walls 35 and 20 and is supported on the partition wall 35. This filter cartridge may comprise a sack or outer covering of wire mesh and a filling of steel wool or other suitable filter material. It will be appreciated that this filter cartridge 42 is rather flexible in construction and may easily be seated in place as shown in Fig. 4 by insertion through one of the apertures 40.

The operation of the machine is substantially as follows: A suitable conduit, not shown, may serve to connect any source of dusty air which it is desired to purify, to the inlet opening 10 in the casing. Operation of the electric motor 22 serves, due to the centrifugal action of the fan 25 in the blower chamber, to draw air axially inwardly through the opening 10 and impart a swirling action to this air around the outer wall of the blower chamber. This air is driven helically downward through the conduit 32 to a point substantially below the outlet openings in the casing. It will be clear that the casings 1 and 14, together with the cylindrical baffle 37, serve to provide an annular space around the outside of this baffle into which air will be delivered by the conduit 32. Due to the helical arrangement of the conduit 32, the air delivered therefrom will be driven with considerable force helically down and around this baffle 37, the centrifugal force of this swirling action tending to drive all of the solid particles toward the outer wall of the casing. These particles will then descend into the hopper 15 and down into the refuse chamber 16 therebeneath. From time to time the refuse chamber 16 may be cleaned out through an aperture 45 covered by means of a suitable pivotally mounted cover plate 46 shown in detail in Fig. 5. The air from around the outside of the baffle 37 after it has descended beneath the lower edge thereof, will enter the space between this baffle 37 and the conical baffle 39 and progress upwardly inside of the baffle 37 past the electric motor 22 and out through the filter cartridge 42 and outlet openings 40. It will be appreciated that the filter 42 serves to remove any dust particles which have not been separated by centrifugal force and that the air discharged through the outlet openings 40 will be substantially dust free.

It will be appreciated from the foregoing that the specific embodiment of the invention illustrated in the drawings and described above is merely representative of one of many forms which the inventive concept defined in the subjoined claims may take. Many other and further modifications thereof will be apparent to those skilled in the art.

I claim as my invention:—

1. In a separator, a substantially cylindrical casing, an inlet in the upper end of said casing, a blower chamber communicating with said inlet, a conduit for conducting air from said blower chamber downwardly in a helical path, an outlet opening disposed above the discharge end of said conduit, and filter means associated with said outlet to further purify air passing through said casings.

2. In a separator, a cylindrical container, a funnel shaped partition in said container having a central opening spaced from the bottom thereof, a cylindrical passage centrally disposed above said partition in said container, a helical conduit discharging between the wall of said passage and the container above said partition, a blower chamber above said passage discharging into said helical conduit, and a discharge for said passage below said blower chamber above said partition.

3. In a separator, a cylindrical container, a funnel shaped partition in said container having a central opening spaced from the bottom thereof, a cylindrical passage centrally disposed above said partition in said container, a helical conduit discharging between the wall of said passage and the container above said partition, a blower chamber above said passage discharging into said helical conduit, a discharge for said passage below said blower chamber above said partition, and a baffle extending across the mouth of said passage.

4. In a separator, a cylindrical container, a funnel shaped partition in said container having a central opening spaced from the bottom thereof, a cylindrical passage centrally disposed above said partition in said container, a helical conduit discharging between the wall of said passage and the container above said partition, a blower chamber above said passage discharging into said helical conduit, a discharge for said passage below said blower chamber above said partition, a baffle extending across the mouth of said passage, a motor in said passage, and an air propelling means operated thereby disposed in said blower chamber.

5. A separator construction comprising a generally cylindrical housing formed to provide a blower chamber in the upper portion thereof, said blower chamber having an inlet opening communicating therewith, partition members in said casing forming an outlet chamber immediately beneath said blower chamber, a substantially cylindrical apron co-axially disposed with respect to said casing depending from said outlet chamber whereby air may enter the lower end of said apron and pass upwardly into said outlet chamber and a helically disposed conduit establishing communication between the peripheral wall of said blower chamber and the space between said apron and casing.

6. A separator construction comprising a casing, a partition member adjacent the upper end of said casing serving to define a blower chamber in the upper end thereof, a cylindrical baffle member coaxially disposed with respect to said casing internally thereof spaced from the walls of said casing, an annular partition member interconnecting said cylindrical member with the walls of said casing thereby to provide an outlet chamber immediately beneath said blower chamber and a helically disposed discharge conduit establishing communication between the peripheral wall of said blower chamber and the space between said cylindrical element and said casing whereby air discharged from said blower chamber may pass helically downwardly through said conduit and thence upwardly through the interior of said cylindrical member into said outlet chamber.

KIRKE W. CONNOR.